United States Patent [19]

Wolfe, Sr.

[11] Patent Number: 4,688,376
[45] Date of Patent: Aug. 25, 1987

[54] ADJUSTABLE CARRIAGE FOR ELECTRIC STRING TRIMMERS

[76] Inventor: Donald E. Wolfe, Sr., 1823 Tower Rd., Aberdeen, Md. 21001

[21] Appl. No.: 863,355

[22] Filed: May 15, 1986

[51] Int. Cl.⁴ ............................................. A01D 53/00
[52] U.S. Cl. ..................................... 56/16.7; 56/12.7; 56/17.2; 56/17.5
[58] Field of Search ...................... 56/12.7, 17.5, 17.2, 56/16.7, 17.1; 172/17; 280/47.2

[56] References Cited

U.S. PATENT DOCUMENTS

| | | | |
|---|---|---|---|
| 4,077,191 | 3/1978 | Pittinger, Sr. et al. | 56/12.7 |
| 4,343,139 | 8/1982 | Lowry et al. | 56/17.5 |
| 4,389,836 | 6/1983 | Lowry et al. | 56/12.7 |
| 4,411,126 | 10/1983 | Lowry et al. | 56/12.7 |
| 4,512,143 | 4/1985 | Jimenez | 56/17.5 |

*Primary Examiner*—Gene Mancene
*Assistant Examiner*—John G. Weiss

*Attorney, Agent, or Firm*—John F. McClellan, Sr.

[57] ABSTRACT

A plural-castor-mounted lightweight tubular frame has a central resilient housing-clamping mechanism adapted for holding a string trimmer having a tapered or other conventional-shape housing at a desired level for trimming weeds or grass. Mechanical advantage and threaded adjustment are provided by the clamping mechanism. The handle of the string trimmer is employed as the handle by which the castor mounted frame and the trimmer held in it are directed. Quick detach/quick attach features enable the string trimmer to be used conveniently by itself when desired. Two height-adjustment provisions can be used, a coarse adjustment of clamping-height, and a fine adjustment of threaded connection between threaded shanks of the castor and clamping nuts at the frame that also provides convenient tilt-adjustment of the string trimmer relative to the ground.

7 Claims, 4 Drawing Figures

ADJUSTABLE CARRIAGE FOR ELECTRIC STRING TRIMMERS

FIELD OF THE INVENTION

This invention relates generally to accessories for power tools and particularly to rolling support for a power tool.

BACKGROUND OF THE INVENTION

U.S. Pat. No. 4,077,191 issued to Charles B. Pittinger, Sr. and Charles B. Pittinger, Jr. on Mar. 7, 1978 disclosed a string trimmer mower with wheel support including castor-provided steering by a fixed handle.

SUMMARY OF THE INVENTION

However, no combination of string trimmer and wheel support is believed to provide the advantages of the present invention according to the objects thereof.

A principal object is to provide a system for adapting a conventional string trimmer as a mower, without need for any modifications to the string trimmer at all, and with speed and ease in the adapting and quick release so that the string trimmer is free to be used again by itself.

Another object is to provide a system as described that with a string trimmer in combination makes an ideal mower for small lawns, and that can be easily and safely stowed in an apartment, an automobile, or a garage, for example.

Further objects are to provide a system as described that can adapt more than one type and more than one size string trimmer, with safe and strong resilient, position-adjustable holding that does not injure a string trimmer held.

Still further objects are to provide a system as described that is lightweight, easy to use, excellent at cutting vegetation, and kind to the back of the user, who is freed from need to hold the string trimmer above the ground.

Yet further objects are to provide a system as described that is easy to make, easy to assemble and to disassemble for shipping, is durable, attractive in appearance, and can trim closely around objects.

BRIEF DESCRIPTION OF THE DRAWINGS

The above and other objects and advantages will become more readily apparent on examination of the following description, including the drawings in which like reference numerals refer to like parts.

DETAILED DESCRIPTION

Figure 1:
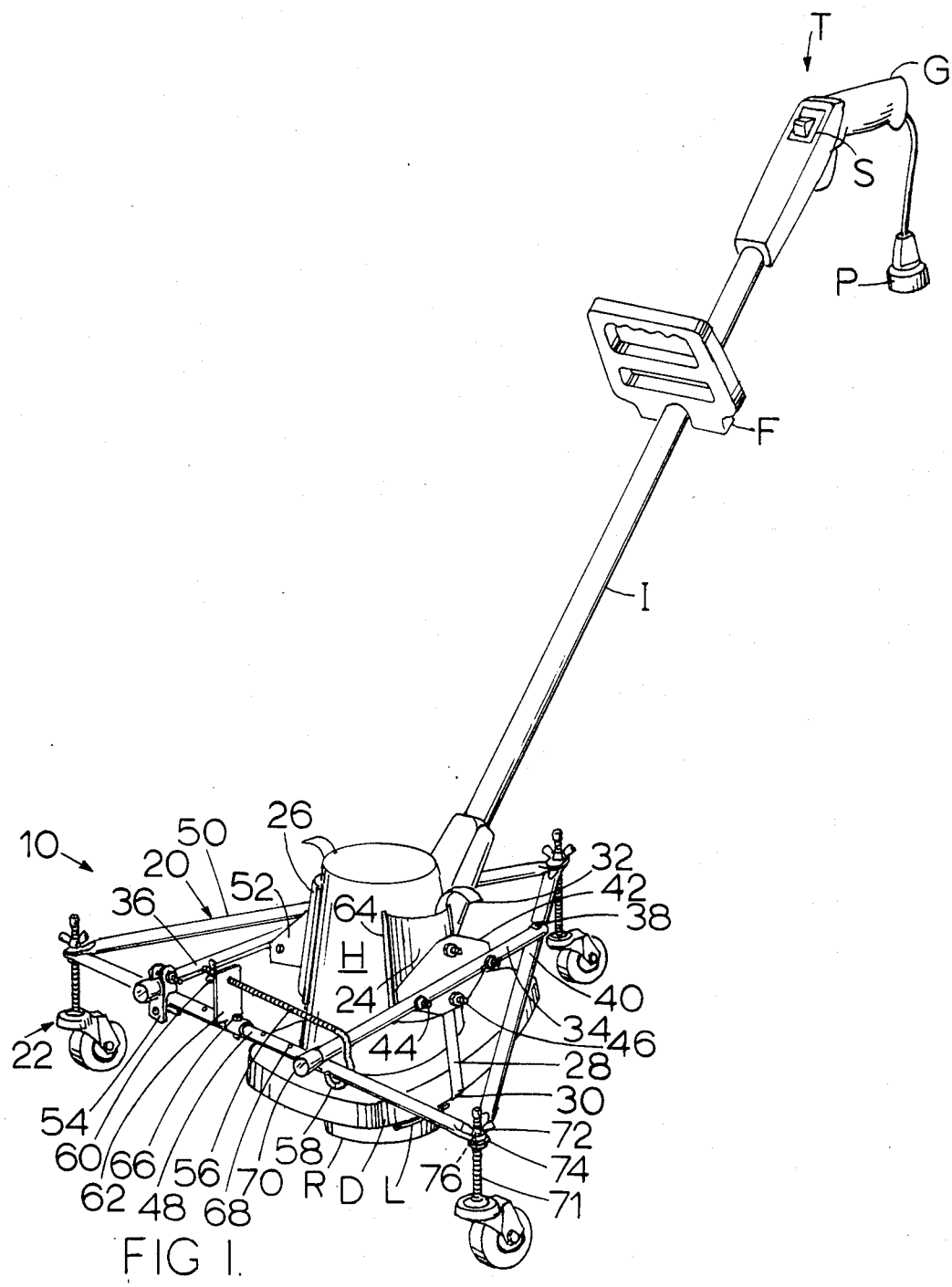
FIG. 1 is a perspective view of a preferred embodiment of the invention ready for use, holding a conventional string trimmer.

FIG. 1 shows the invention in a preferred embodiment 10 ready for use in cutting vegetation.

A conventional string trimmer T is used of the type having a rotary head R with length of string L deployed from it below a deflector shield D fixed on the bottom of a motor housing H having an integral handle I extending up at an oblique angle to a first grip F (if desired) and a second or terminal grip G with electric switch and line plug P.

In accordance with the invention, a lightweight, triangular-shape tubular frame 20 with substantially equal apexes mounted on castors 22 (preferably one at each corner of the triangular frame, but more could be used) supports the motor housing by a pair of laterally opposed, resilient, "C"-section (or "C"-shaped clamps) 24, 26. Each clamp has depending from it a safety hook, 28 shown, in the form of a strap with an inward-curved lower end 30 curling under and supportively engaging a respective lower edge of the shield D or flange. Each safety hook extends up and out above a respective clamp as a handle 32.

For clamping-adjustment of the clamps 24, 26 a respective pivotal bar 34, 36 is provided on each side, each supporting a clamp. On the near side pivotal bar 34 (or tube) pivots about vertical bolt 38 passing through the rear of the pivotal bar and the frame member 40 near the rear apex of the frame 20. Midway the length of the pivotal bar 34 a plate 42 is fixed to the inner side of the bar by a pair of horizontally spaced bolts, 44 indicated.

The plate 42 projects above and below the bar. Through the projections a pair of vertically spaced bolts 46, indicated, pass, and pass also through corresponding holes in the "C"-shaped clamp 24 and in the safety hook 28, resiliently securing these elements together.

The forward end of pivotal bar 34 lies on the front member or cross-member 48 of the triangular frame 20.

On the other side of the housing H pivotal bar 36 is similarly pivoted to a frame member, 50, and fixed to the corresponding plate 52 that similarly bolts to that clamp 26 and safety hook. The pivotal bar 36 similarly extends forwardly and lies on the frame member 48 to which clamp bracket 54 adjustably affixes it.

The first pivotal bar 34 has a fine adjustment for exerting clamping force with less danger of crushing, in the form of a threaded rod 56 terminating in a hooked end 58 at right angles to the length of the rod 56 so that the hook passes around the bottom of transverse frame member or front cross member 48 and pulls against pivotal bar 34 when nut 60 is tightened against the first clamp bracket 62.

Force of clamping is exerted along an axis-parallel central longitudinal part of the resilient clamps 24, 26, so that they flex and accommodate to various conical or otherwise tapered housing shapes as well as cylindrical shapes. Rubber buffers 64 cushion the upright contacting edges. First clamp bracket 62 has a hole for passage of a bolt 66 into a selected hole of a series of holes 68 in the frame member 48. Crutch tips 70 may cushion the protruding front ends of the pivot bars.

Height that the string trimmer is held above the ground, and angle of tip with respect to the ground, are fine-adjustable by adjustment of extension of the threaded shanks 71 of the castors using first and second nuts 72 and 74 above and below the frame corners, through holes 76 in which the threaded shanks pass. Advantageously, the frame uses these provisions for assembly also. It will be appreciated that the frame can be threaded to serve as one of the nuts.

Disassembly is as easy as assembly, as for example, when the string trimmer is to be used alone instead of as part of the rolling mower arrangement. The user simply backs-off on nut 60 to loosen the rod 56, rotates the hook portion of the rod free of the frame member 48, swings the pivotal bar 34 outward clear of the string trimmer, and lifts the string trimmer free.

Figure 2:
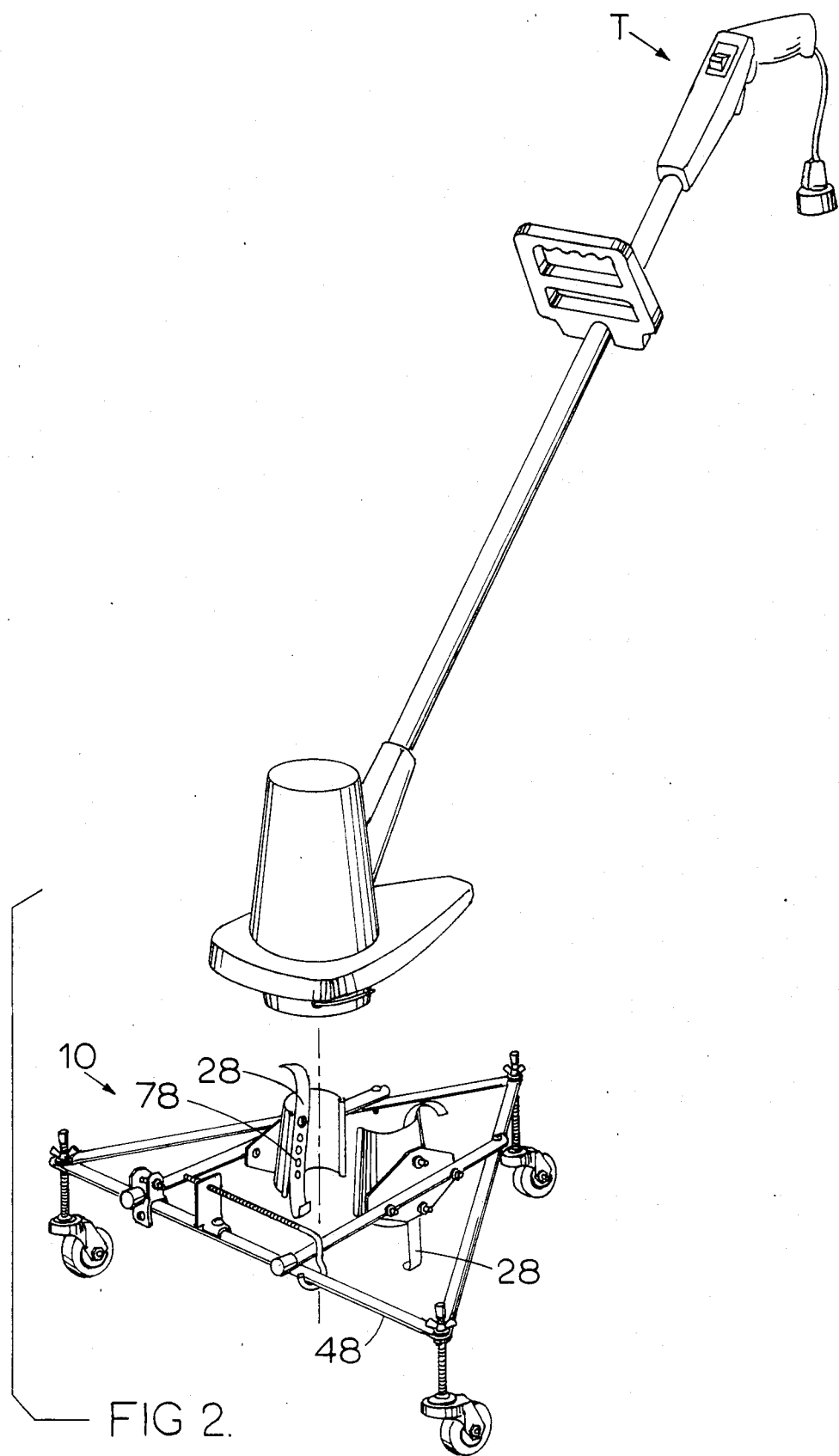
FIG. 2 is a partially exploded view showing the preferred embodiment with a conventional string trimmer in position for being lowered into place and held by it.

FIG. 2 shows that the safety hooks 28 can be coarsely set at different heights, as desired, by bolting through selected ones of a series of holes 78 supplied in them. It is evident also that the string trimmer T can be installed 180 degrees from the position shown, if it is wanted to have the frame member 48 face the rear (adjacent the user).

Figure 3:
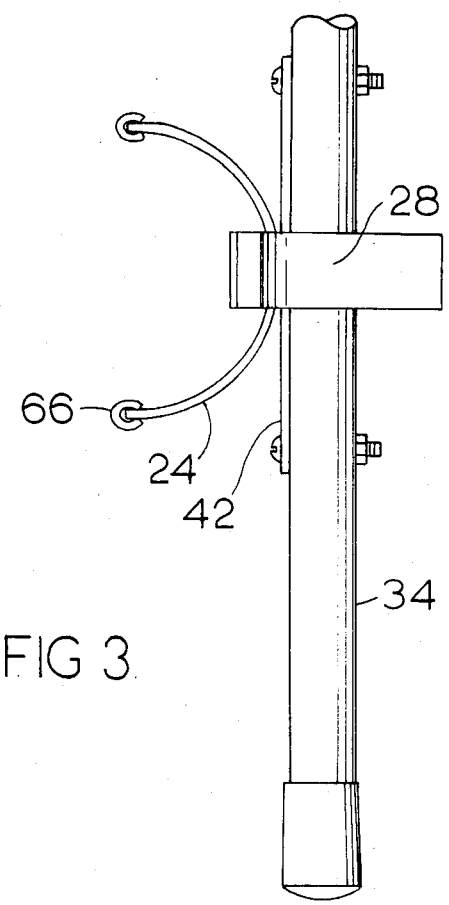
FIG. 3 is an enlarged fragmentary detail, diagrammed in plan view, of a clamping portion.

FIG. 3 diagrams in top plan view the detail of clamp 24 safety hook 28, plate 42 and pivotal bar 34; 66 is a rubber buffer.

Figure 4:
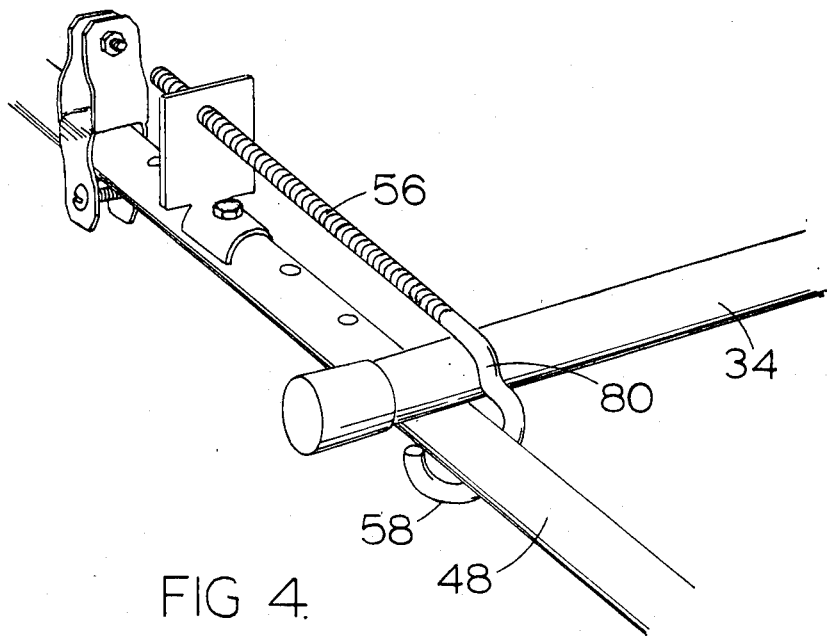
FIG. 4 is an enlarged fragmentary perspective detail of a clamping adjustment.

FIG. 4 shows the fine adjustment provided by threaded rod 56, and the compound shape at hooked end 58, first an off-set 80 and then the hook 58 at the end, to fit respectively the two tubular portions 34 and 48.

Material for the frame may be aluminum tubing, the "C"-section clamps may be spring steel or a suitable thermoplastic, the castors may be of aluminum or thermoplastic.

It will be appreciated that the entire easily assembled frame, ready for use, weighs only a few pounds but is strong and durable and easily manipulated on the wheels.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Patent is:

1. In a system for carrying a string trimmer in spaced relation with the ground on wheels, said string trimmer being of the type having a housing with a flange, a rotary portion with a string extending therefrom below the flange in spaced relation with the ground, and a handle affixed at an upward angle from said housing; the improvement comprising: a frame, means for detachably clamping said housing to the frame, a plurality of downwardly extending wheel assemblies for supporting the frame, means for adjusting said rotary portion in spaced relation with the ground, the means for detachably clamping including a pair of opposed "C"-shaped clamps and means for forcing the "C"-shaped clamps towards each other and holding a said housing therebetween, the "C"-shaped clamps being resilient, and the means for forcing including a first pivotal bar and a second pivotal bar, a respective intermediate portion of the first pivotal bar and the second pivotal bar having an attachment to a respective "C"-shaped clamp, means for pivotally affixing a first end of said first pivotal bar and a first end of said second pivotal bar to respective frame portions, and means for adjustably affixing a second end of the first pivotal bar and a second end of the second pivotal bar to respective frame portions.

2. In a system as recited in claim 1, said frame including first, second and third frame members, means for assembling the first, second and third frame members in triangular shape having three substantially equal apexes, each of said wheels comprising a castor, and means for adjustably mounting each castor at a respective said apex.

3. In a system as recited in claim 2, said means for adjustably mounting including a threaded shank on each castor passing through an aperture in a respective said apex, and first and second nuts on said threaded shank respectively above and below each said apex.

4. In a system as recited in claim 1, the means for adjustably affixing the second end of the first pivotal bar including a clamp bracket on the frame, a rod with a hook portion and a threaded shank, a nut, the threaded shank adjustably engaging the clamp bracket by means of the nut, and the hook portion engaging said frame.

5. In a system as recited in claim 1, said attachment to the "C"-shaped clamp to the first pivotal bar including a plate, a plurality of horizontally spaced fasteners attaching the plate to the first pivotal bar, and a plurality of vertically spaced fasteners attaching the plate to the "C"-shaped clamp.

6. In a system as recited in claim 1, a safety hook at each of said "C"-shaped clamps, means for adjustably securing each safety hook to a respective "C"-shaped clamp, and each safety hook having a lower end positionable for hooking beneath said housing.

7. In a system as recited in claim 1, a safety hook at each of said "C"-shaped clamps, means for adjustably securing each safety hook to a respective "C"-shaped clamp, and each safety hook having a lower end positionable for hooking beneath said housing.

* * * * *